US012739399B2

(12) United States Patent
Kwong et al.

(10) Patent No.: US 12,739,399 B2
(45) Date of Patent: Sep. 15, 2026

(54) QUALITY-BASED PROCESSING OF VIDEO

(71) Applicant: City University of Hong Kong, Kowloon (HK)

(72) Inventors: Sam Tak Wu Kwong, Kowloon (HK); Yunhao Mao, Kowloon (HK); Shiqi Wang, Kowloon (HK)

(73) Assignee: City University of Hong Kong, Kowloon (HK)

( * ) Notice: Subject to any disclaimer, the term of this patent is extended or adjusted under 35 U.S.C. 154(b) by 217 days.

(21) Appl. No.: 18/650,638

(22) Filed: Apr. 30, 2024

(65) Prior Publication Data

US 2024/0388718 A1 Nov. 21, 2024

Related U.S. Application Data

(60) Provisional application No. 63/502,444, filed on May 16, 2023.

(51) Int. Cl.
*H04N 19/146* (2014.01)
*H04N 19/172* (2014.01)

(52) U.S. Cl.
CPC ......... *H04N 19/146* (2014.11); *H04N 19/172* (2014.11)

(58) Field of Classification Search
CPC ..... H04N 19/00; H04N 19/142; H04N 19/176
See application file for complete search history.

(56) References Cited

U.S. PATENT DOCUMENTS 6,831,947 B2 12/2004 Ribas Corbera
8,532,169 B2 9/2013 Wang et al.
8,588,296 B2 11/2013 Yang et al.
9,860,543 B2 1/2018 Xu et al.
10,542,262 B2 1/2020 Gao et al.
10,560,696 B2 2/2020 Gao et al.
11,025,914 B1 6/2021 Yuen et al.
(Continued)

FOREIGN PATENT DOCUMENTS

| CN | 106416251 | 2/2020 |
|---|---|---|
| CN | 107113432 | 9/2020 |
| JP | 6019189 | 11/2016 |

OTHER PUBLICATIONS

B. Bross, Y.-K. Wang, Y. Ye, S. Liu, J. Chen, G. J. Sullivan, and J.-R. Ohm, “Overview of the versatile video coding (VVC) standard and its applications,” IEEE Transactions on Circuits and Systems for Video Technology, vol. 31, No. 10, pp. 3736-3764, 2021.
(Continued)

*Primary Examiner* — Kyle M Lotfi

(74) *Attorney, Agent, or Firm* — Renner, Kenner, Greive, Bobak, Taylor & Weber

(57) ABSTRACT

There is provided a computer-implemented method for processing a video. The computer-implemented method includes: (a) determining a target frame-level quality required for a frame of the video to be encoded, the determining of the target frame-level quality is based on, at least, a rate-quantization (R-Q) model that relates bit-rate and quantization step size and a quality-quantization model that relates quality measure and the quantization step size; and (b) determining one or more coding parameters for encoding the frame based on the determined target frame-level quality.

16 Claims, 10 Drawing Sheets

(56) References Cited

U.S. PATENT DOCUMENTS

| | | | | |
|---|---|---|---|---|
| 2003/0031128 | A1* | 2/2003 | Kim | H04N 5/147 375/E7.137 |
| 2005/0175109 | A1* | 8/2005 | Vetro | H04N 19/147 375/E7.181 |
| 2016/0301931 | A1* | 10/2016 | Wen | H04N 19/192 |
| 2021/0400273 | A1* | 12/2021 | Rapaka | H04N 19/124 |

OTHER PUBLICATIONS

G. J. Sullivan, J. Ohm, W. Han, and T. Wiegand, "Overview of the high efficiency video coding (HEVC) standard," IEEE Transactions on Circuits and Systems for Video Technology, vol. 22, No. 12, pp. 1649-1668, 2012.

A. Wieckowski, J. Brandenburg, T. Hinz, C. Bartnik, V. George, Hege, C. Helmrich, A. Henkel, C. Lehmann, C. Stoffers, I. Zupancic, B. Bross, and D. Marpe, "Vvenc: An open and optimized Vvc encoder implementation," in 2021 IEEE International Conference on Multimedia Expo Workshops (ICMEW), pp. 1-2.

L. Li, B. Li, H. Li, and C. W. Chen, "A-domain optimal bit allocation algorithm for high efficiency video coding," IEEE Transactions on Circuits and Systems for Video Technology, vol. 28, No. 1, pp. 130-142, 2018.

M. Zhou, X. Wei, S. Kwong, W. Jia, and B. Fang, "Rate control method based on deep reinforcement learning for dynamic video sequences in HEVC," IEEE Transactions on Multimedia, vol. 23, pp. 1106-1121, 2020.

Z. He, Y. Kim, and S. K. Mitra, "Low-delay rate control for DCT video coding via p-domain source modeling," IEEE Transactions on Circuits and Systems for Video Technology, vol. 11, No. 8, pp. 928-940, 2001.

B. Li, H. Li, L. Li, and J. Zhang, "λ-domain rate control algorithm for high efficiency video coding," IEEE Transactions on Image Processing, vol. 23, No. 9, pp. 3841-3854, 2014.

Y. Mao, M. Wang, S. Wang, and S. Kwong, "High efficiency rate control for versatile video coding based on composite cauchy distribution," IEEE Transactions on Circuits and Systems for Video Technology, 2021.

F. Liu and Z. Chen, "Multi-objective optimization of quality in vvc rate control for low-delay video coding," IEEE Transactions on Image Processing, vol. 30, pp. 4706-4718, 2021.

M. Zhou, X. Wei, C. Ji, T. Xiang, and B. Fang, "Optimum quality control algorithm for versatile video coding," IEEE Transactions on Broadcasting, vol. 68, No. 3, pp. 582-593, 2022.

Z. Wang, A. C. Bovik, H. R. Sheikh, and E. P. Simoncelli, "Image quality assessment: from error visibility to structural similarity," IEEE transactions on image processing, vol. 13, No. 4, pp. 600-612, 2004.

K. Ding, K. Ma, S. Wang, and E. P. Simoncelli, "Image quality assessment: unifying structure and texture similarity," IEEE transactions on pattern analysis and machine intelligence, 2020.

H. Choi, J. Yoo, J. Nam, D. Sim, and I. V. Bajic, "Pixel-wise unified rate-quantization model for multi-level rate control," IEEE Journal of Selected Topics in Signal Processing, vol. 7, No. 6, pp. 1112-1123, 2013.

S. Ma, W. Gao, and Y. Lu, "Rate-distortion analysis for 264/AVC video coding and its application to rate control," IEEE Transactions on Circuits and Systems for Video Technology, vol. 15, No. 12, pp. 1533-1544, 2005.

A. Paszke, S. Gross, F. Massa, A. Lerer, J. Bradbury, G. Chanan, T. Killeen, Z. Lin, N. Gimelshein, L. Antiga et al., "Pytorch: An imperative style, high-performance deep learning library," Advances in neural information processing systems, vol. 32, 2019.

M. Sugawara, S.-Y. Choi, and D. Wood, "ultra-high-definition television (Rec. ITU-R BT.2020): A generational leap in the evolution of television [standards in a nutshell]," IEEE Signal Processing Magazine, vol. 31, No. 3, pp. 170-174, 2014.

F. Bossen, J. Boyce, K. Suehring, X. Li, and V. Seregin, "JVET common test conditions and software reference configurations for SDR video," JVET T2010, Oct. 2020.

* cited by examiner

QUALITY-BASED PROCESSING OF VIDEO

TECHNICAL FIELD

The present invention relates to methods and systems for processing a video.

BACKGROUND

In recent years, the demand for multimedia applications has increased, and a series of video coding standards that aim for higher video compression efficiency have been developed. One state-of-the-art video coding standard is Versatile Video Coding (VVC) [1], which can achieve compression efficiency improvement compared to High Efficiency Video Coding (HEVC) [2]. A series of advanced coding tools have been adopted by VVC for improved coding performance (at the expense of high computational complexity). In the VVC Test Model (VTM-17.2), encoding complexity has increased by more than six times compared to the HEVC reference software (HM-16.24). For real-world applications, the Fraunhofer Versatile Video Encoder (VVenC) [3] is developed by Fraunhofer HHI as an open-source VVC encoder implementation with systematic optimizations. In VVenc 1.6.0, encoding speed is more than 15 times faster than VTM-17.2 while the BD-Rate loss is lower than 2% under the slower preset. VVenc provides feasible access to VVC for the academic and industrial community, which enables researchers to work with higher efficiency.

With the increasing demand for high quality videos, improved quality control is required for the video coding.

SUMMARY OF THE INVENTION

In this example, a Deep Image Structure and Texture Similarity (DISTS) based quality control scheme is developed for Versatile Video Coding (VVC). More specifically, frame-level relationship between Quantization Parameter (QP) and DISTS value (D) is first investigated to establish a DISTS-Quantization (D-Q) model. Then, an adaptive quality control scheme, which ensures optimal Rate-Distortion (R-D) performance, is proposed. In this disclosure, the proposed quality control scheme is implemented on VVenc 1.6.0, an open-source encoder of VVC. Experimental results show that due to proper quality control, the proposed quality control scheme in this example, compared with some existing methods, achieves Rate-Distortion (R-D) performance gain and better perceptual quality.

In a first aspect, there is provided a computer-implemented method for processing a video. The computer-implemented method includes: (a) determining a target frame-level quality required for a frame of the video to be encoded, the determining of the target frame-level quality is based on, at least, a rate-quantization (R-Q) model that relates bitrate and quantization step size and a quality-quantization model that relates quality measure and the quantization step size; and (b) determining one or more coding parameters for encoding the frame based on the determined target frame-level quality. The target frame-level quality may be represented as a value. The target frame-level quality may be a target frame-level perceptual quality. The quality measure of the quality-quantization model may be a perceptual quality measure such as a machine-learning-based perceptual quality measure.

Optionally, the R-Q model is a linear R-Q model.

Optionally, the R-Q model is defined by $$R = \frac{\gamma}{Q},$$

where R is bitrate, Q is quantization step size, and $\gamma$ is model parameter of the R-Q model.

Optionally, the quality-quantization model comprises a DISTS-quantization (D-Q) model that relates deep image structure and texture similarity (DISTS) value and the quantization step size. Deep image structure and texture similarity (DISTS) value is a measure of perceptual quality of an image.

Optionally, the D-Q model is defined as $D=\alpha Q^{\beta}$, where D is DISTS value, Q is quantization step size, and $\alpha$ and $\beta$ are model parameters of the D-Q model.

Optionally, the computer-implemented method further comprises determining a target GOP-level quality required for a group of pictures (GOP) of the video, the GOP includes a plurality of frames including the frame to be encoded. Optionally, the determining of the target frame-level quality is further based on the determined target GOP-level quality. The target GOP-level quality may be represented as a value. The target GOP-level quality may vary as the frame(s) of the GOP is/are encoded.

For example, the target frame-level quality may be a target frame-level DISTS value. For example, the target GOP-level quality may be a target GOP-level DISTS value.

Optionally, the computer-implemented method further comprises determining a sequence-level quality for a sequence of the video, the sequence of the video including a plurality of GOPs that includes the GOP. The sequence-level quality may be represented as a value such as a sequence-level DISTS value. Optionally, the determining of the target GOP-level quality required for the GOP of the video is based on the determined sequence-level quality. Optionally, the determining of the sequence-level quality (e.g., DISTS value) is based on a plurality of CTU-level quality values (e.g., DISTS values). For example, the sequence-level quality (e.g., DISTS value) may be determined based on averaging the plurality of CTU-level DISTS values.

Optionally, the determining of the target frame-level quality (e.g., value) required for the frame of the video comprises distributing or allocating at least part of the target GOP-level quality (e.g., target GOP-level DISTS value) to the plurality of frames of the GOP.

Optionally, the determining of the target frame-level quality required for the frame of the video comprises determining the target frame-level quality (e.g., target frame-level DISTS value) while optimizing (e.g., minimizing) a GOP-level rate-distortion (R-D) cost function.

Optionally, the GOP-level R-D cost function is defined based on, at least, a GOP-level Lagrangian multiplier for the GOP.

Optionally, the GOP-level Lagrangian multiplier is related to the target GOP-level quality through at least the R-Q model and the D-Q model.

Optionally, the determining of the target frame-level quality required for the frame of the video comprises determining the target frame-level quality (e.g., target frame-level DISTS value) required for the frame of the video based on the GOP-level Lagrangian multiplier.

Optionally, the one or more the coding parameters for encoding the frame comprises a quantization parameter and a Lagrangian multiplier.

Optionally, the determining of the quantization parameter is based on $$Q = \left(\frac{D}{\alpha}\right)^{\frac{1}{\beta}} \text{ and } QP = \log_X(Q) \times A + B,$$

where D is the target frame-level quality represented as a target frame-level DISTS value, Q is the quantization step size, α and β are are model parameters of the D-Q model, QP is the quantization parameter, A,B, and X are constants.

Optionally, the determining of the Lagrangian multiplier is based on $$\lambda = C \times D^{\frac{QP}{E}},$$

where λ is the Lagrangian multiplier, QP is the quantization parameter, C, D, and E are constants.

Optionally, the computer-implemented method further comprises: (c) encoding the frame based on the one or more determined coding parameters.

Optionally, the computer-implemented method further comprises: (d) determining, based on the encoding of the frame, an output bitrate and an output quality (e.g., value, such as DISTS value) of the frame; and (e) updating, based on the determined output bitrate and output quality (e.g., value, such as DISTS value), one or more of the model parameters of the R-Q model and the quality-quantization model (e.g., the D-Q model).

Optionally, the updating in (e) is performed based on a gradient descent update method.

Optionally, the frame is a first frame, and the computer-implemented method further comprises: determining a target frame-level quality required for a second frame of the video to be encoded, the determining of the target frame-level quality is based on, at least, the rate-quantization (R-Q) model and the quality-quantization model with the updated model parameter(s); and determining one or more coding parameters for encoding the second frame based on the determined target frame-level quality. Optionally, the first and second frames are consecutive frames of the video.

Optionally, the computer-implemented method further comprises: performing or repeating steps (a) to (e) for multiple (e.g., substantially all) frames of the video. Optionally, the computer-implemented method is performed for e.g., at least 50%, at least 60%, at least 70%, at least 80%, at least 90%, etc. of all of the frames of the video.

Optionally, the encoding in (c) is performed based on versatile video coding (VVC) based technique, e.g., VVenc based technique.

The computer-implemented method in the first aspect may be applicable for, among other standards, the versatile video coding (VVC) standard.

In a second aspect, there is provided a system for processing a video, comprising: one or more processors; and a memory storing one or more programs configured to be executed by the one or more processors, the one or more programs including instructions for performing or facilitating performing of the computer-implemented method of the first aspect.

In a third aspect, there is provided a non-transitory computer-readable storage medium storing one or more programs configured to be executed by one or more processors, the one or more programs including instructions for performing or facilitating performing of the computer-implemented method of the first aspect.

Other features and aspects of the disclosure will become apparent by consideration of the detailed description and accompanying drawings. Any feature(s) described herein in relation to one aspect or embodiment may be combined with any other feature(s) described herein in relation to any other aspect or embodiment as appropriate and applicable.

BRIEF DESCRIPTION OF DRAWINGS

Embodiments of the invention will now be described, by way of example, with reference to the accompanying drawings in which:

FIG. 1B: "BQMall", B Slice; FIG. 1C: "Cactus", I Slice; FIG. 1D: "Cactus", B Slice);

Figure 1A:
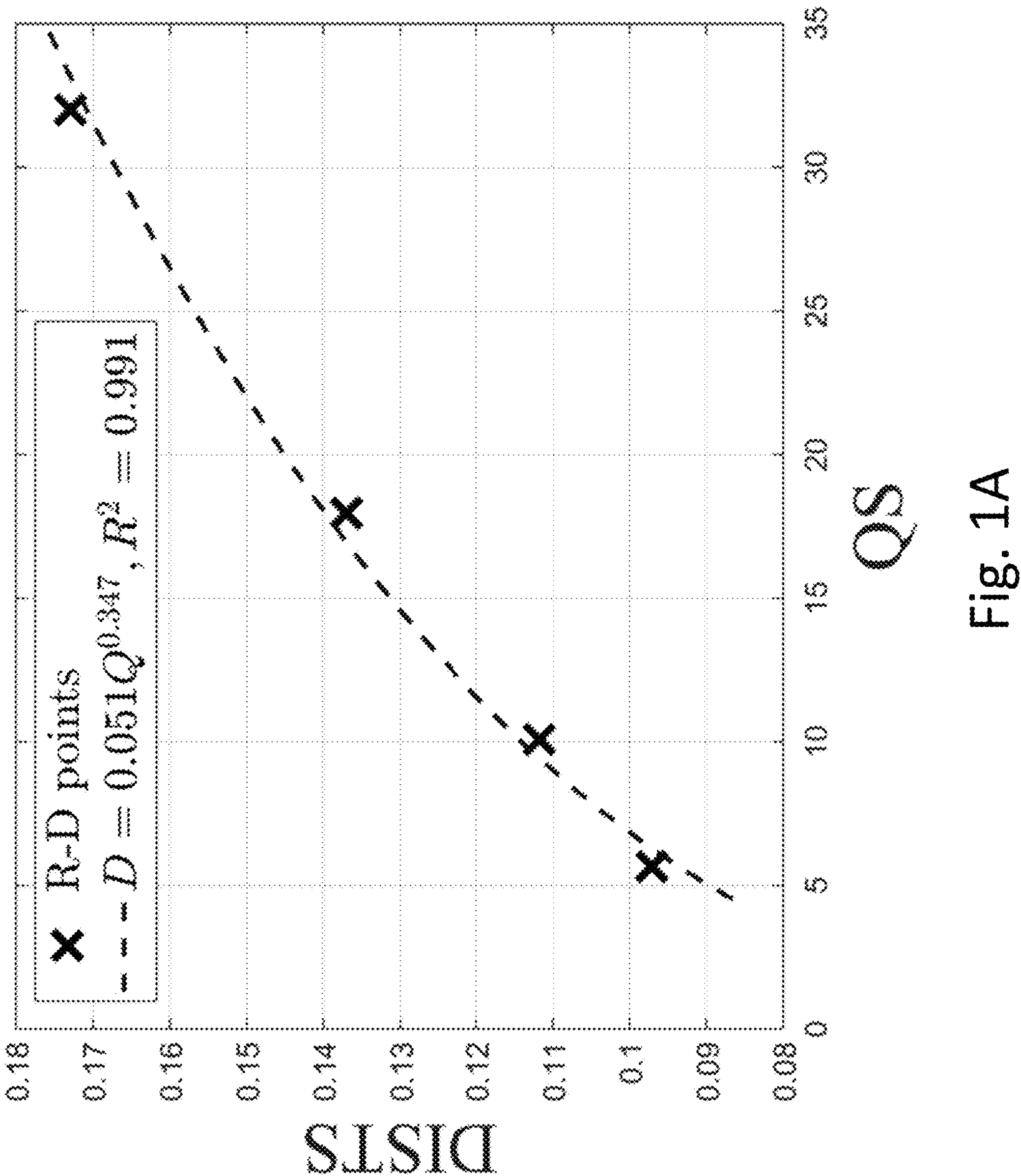
FIGS. 1A to 1D illustrate D-Q relationship of the utilized D-Q model for video sequences "BQMall" and "Cactus" in one embodiment of the invention (FIG. 1A: "BQMall", I Slice.
Figure 1B:
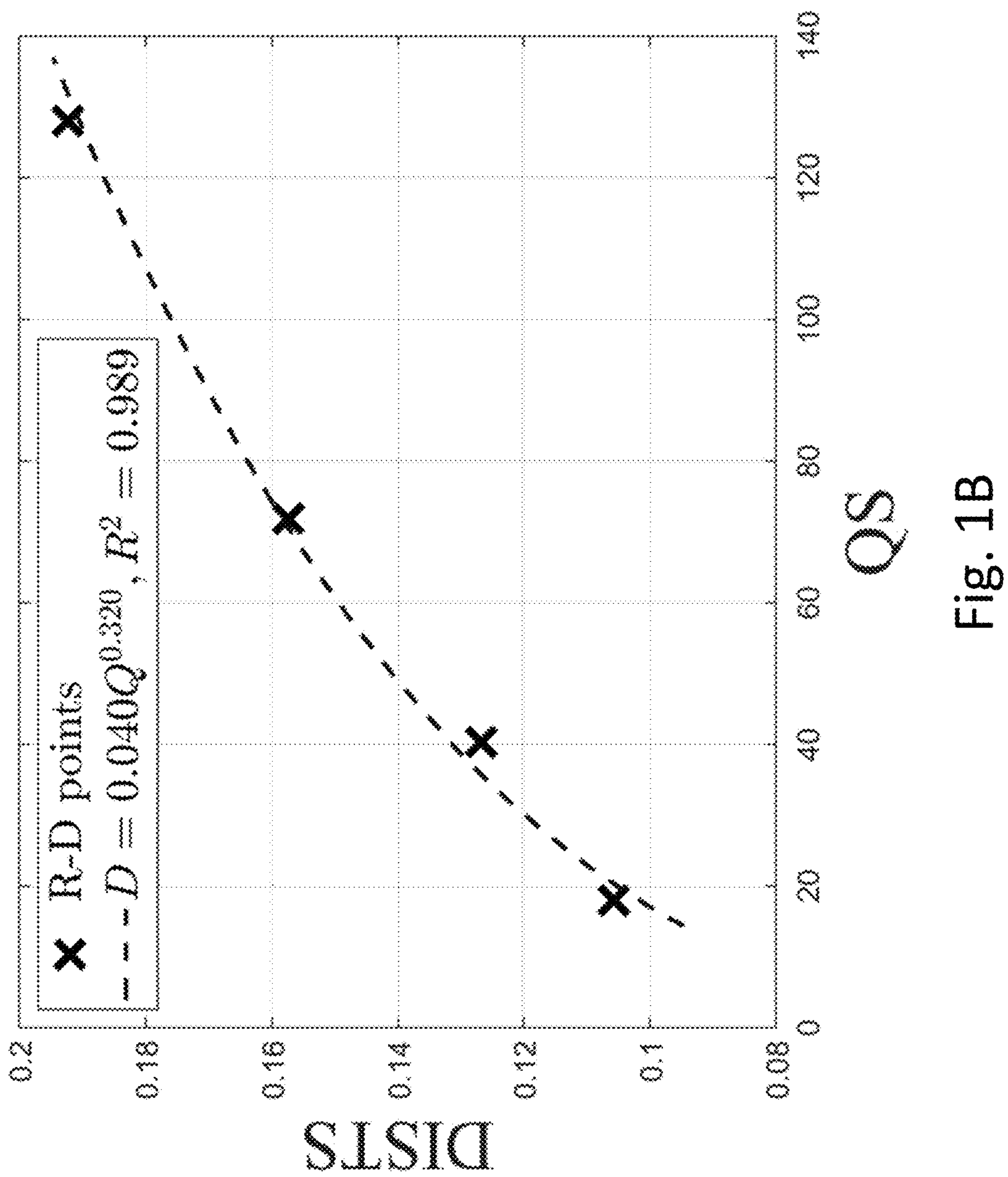
Figure 1C:
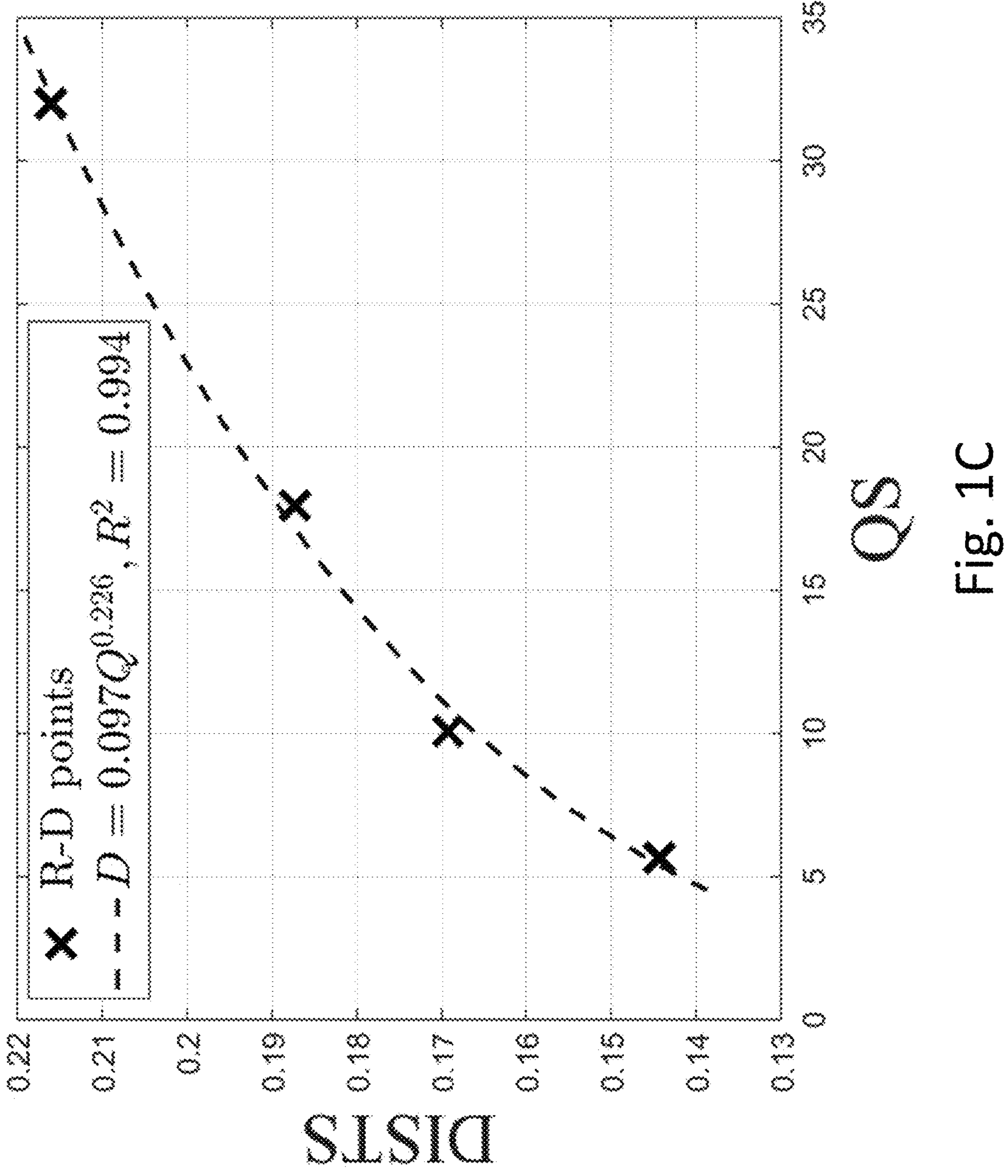
Figure 1D:
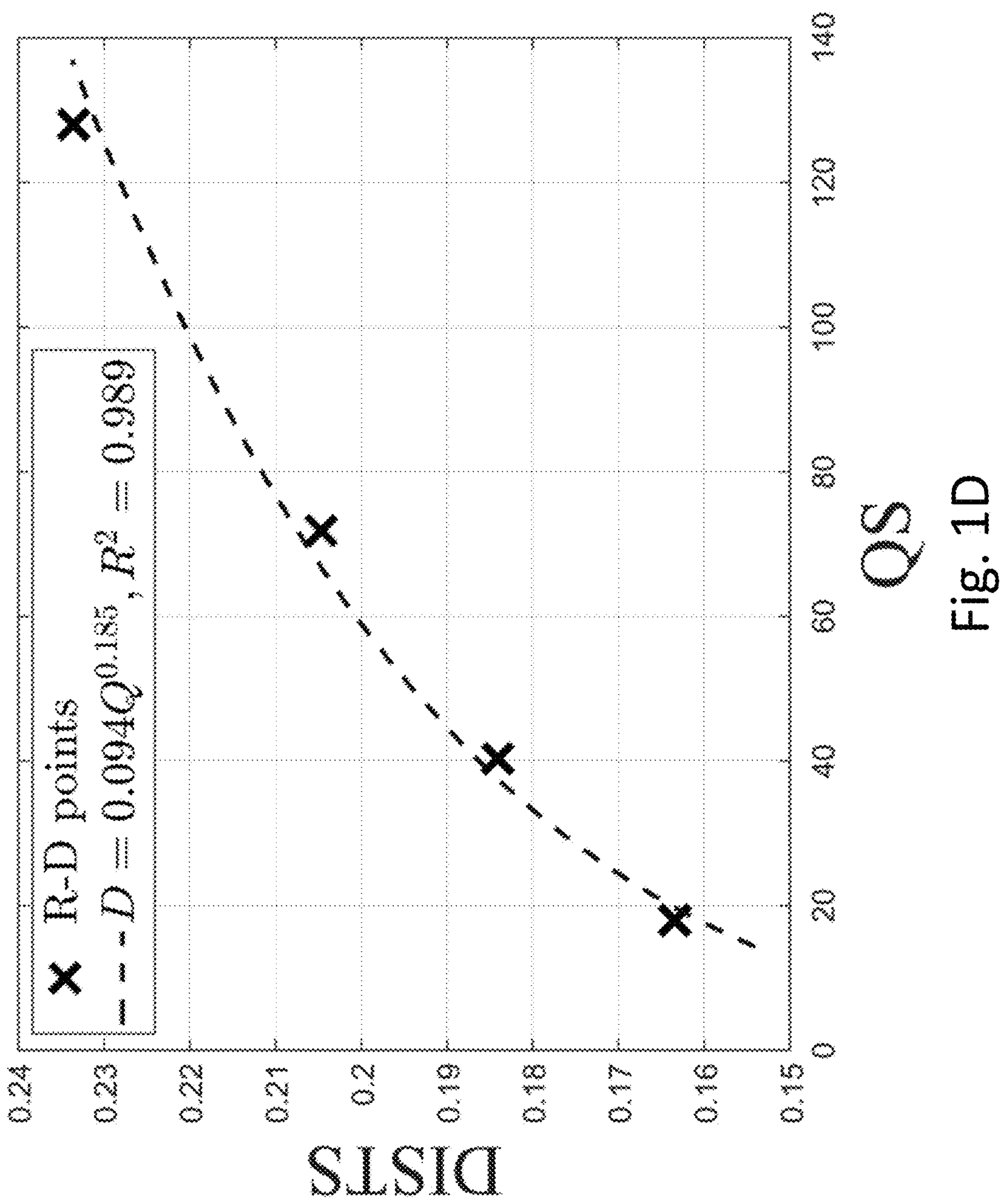

Before any embodiments of the invention are explained in detail, it is to be understood that the invention is not limited in its application to the details of embodiment and the arrangement of components set forth in the following description or illustrated in the following drawings. The invention is capable of other embodiments and of being practiced or of being carried out in various ways. Also, it is to be understood that the phraseology and terminology used herein is for the purpose of description and should not be regarded as limiting.

DETAILED DESCRIPTION

Hereinafter, some embodiments of the invention will be described in detail with reference to the drawings.

DISTS Based Perceptual Quality Control for VVC

Rate control is an important operation in video coding, especially for providing the best/optimal video quality with the constrained bit-rate. Rate control generally includes two main steps: bit allocation and parameter derivation. Given the overall target bit-rate, it is necessary to allocate bit-rate on Group-of-Pictures (GOP) level and frame-level, respectively. The principle is to find an allocation scheme that can minimize the total Rate-Distortion (R-D) cost. Some existing rate control algorithms [4, 5] extend bit allocation to CTU-level, to obtain Rate-Distortion (R-D) performance improvement. Given the target bit-rate, Quantization Parameter (QP) and λ are derived for the encoding frame and each CTU. Herein, rate control algorithms build a robust model between target bit-rate and coding parameters. Rate control algorithms can be categorized into three types based on based on model types. These three types of rate control algorithms include: Q-domain rate control, ρ-domain rate control, and λ-domain rate control. Trying to build a Rate-Quantization (R-Q) model, Q-domain rate control has been investigated since TM5 which was adopted by MPEG-2. Since then, Q-domain rate control is applied in commercial codecs due to its high accuracy and convenience for implementation. He et al. [6] developed the ρ-domain rate control by establishing a linear relationship between bit-rate and percentage of zero coefficients. The ρ-domain rate control may achieve better coding performance. Li et al. [7] proposes λ-domain rate control, which attempts to establish the Rate-λ (R-λ) relationship. Afterwards, λ-domain rate control is further developed by adopting an optimal bit allocation scheme [4]. Due to accurate parameter estimation and proper bit allocation, λ-domain rate control achieves good Rate-Distortion (R-D) performance and is adopted by HEVC and VVC. The bit allocation scheme in λ-domain rate control can be further refined by taking frame dependency into consideration [8].

As the demand for high quality videos increases, quality fluctuation of compressed video has become a more important problem, especially for videos with high resolution and fast frame rate. Similar to rate control algorithms, quality control minimizes consumed bit-rate with constrained video quality, which can be applied to high-quality video coding without bandwidth limitations. Liu [9] forms a multi-objective optimization which takes bit-rate, overall distortion, and quality fluctuation into consideration, to achieve a balance among three multiple objectives. Zhou [10] proposes a quality control algorithm which can accurately ensure objective quality and Rate-Distortion (R-D) performance of each frame.

VVC utilizes peak signal to noise ratio (PSNR) as the metric of video quality. However, PSNR, which is derived from Mean Square Error (MSE), compares the pixel-to-pixel difference between two frames, which may show a poor correlation with human visual system (HVS). The Structural Similarity (SSIM) index [11] takes structure similarity into consideration. Recently, machine learning based image quality assessment (IQA) methods that can learn the difference between texture features have been explored. Ding et al. [12] proposes Deep Image Structure and Texture Similarity (DISTS), which unifies structure and texture similarity, and can achieve good results when compared with human quality ratings.

In this example, a DISTS based quality control scheme is designed for better visual quality on VVenc 1.6.0 platform. In this example, the DISTS-Quantization (D-Q) relationship is first investigated. Then, a quality allocation scheme is designed on picture level for better Rate-Distortion (R-D) performance. Given the target DISTS value of a frame, QP is derived according to the D-Q model. Experiments are performed to verify the effectiveness of the proposed method.

I. Rate and Distortion Models

In this section, the relationship between distortion metric and coding parameters is investigated, based on which a quality control scheme is further established. As mentioned, based on the parameters selected to build models, existing rate control algorithms includes Q-domain rate control and λ-domain rate control. Considering fitting accuracy and model robustness, coding parameter QP is used as a key parameter for building D-Q and R-Q models.

A. Utilized D-Q Model

In this example, two sequences "BQMall" and "Cactus" are first encoded with four different QPs under Random Access (RA) configurations. After encoding each CTU, the original pixels and reconstructed pixels are sent to the neural network provided in [12] for processing, to obtain the corresponding CTU-level DISTS value. In one example the sequence level overall DISTS value can be derived by calculating the average of all CTU-level DISTS values. The obtained sequence level DISTS value and corresponding quantization step size (Q) are plotted in FIGS. 1A to 1D. From FIGS. 1A to 1D, it can be seen that the hyperbolic D-Q function achieves a high fitting accuracy for both I-Slice and B-Slice. At the same time, updating parameters for hyperbolic function is relatively convenient. In this example the utilized D-Q model can be written as:

$$D=\alpha Q^{\beta} \tag{1}$$

where α and β are model parameters and Q is the quantization step size.

B. Utilized R-Q Model

Several R-Q models have been proposed [8, 13, 14]. In this example, the following R-Q model is used:

$$R=\frac{\gamma}{Q} \tag{2}$$

where γ is the model parameter. In this example, Equation (2) is utilized as the R-Q model.

II. Quality Control Scheme

Given the R-Q and D-Q models, a DISTS based quality control scheme is built considering the overall Rate-Distortion (R-D) performance. First, DISTS values are allocated on different granularities to obtain target DISTS value for each frame. Then, coding parameters can be derived according to target DISTS value.

A. Quality Allocation

In this example, quality allocation is operated on GOP-level and frame-level respectively, which aims to assign proper target DISTS value for each frame.

1) GOP-Level Quality Allocation

Given the sequence level DISTS value $D_{seq}$, a sliding window based quality allocation scheme is employed to flatten target DISTS value $$D_{GOP}^{t}$$

for each GOP.

$$D'_{GOP}$$

can be derived as:

$$D'_{GOP} = D_{GOP} - \frac{D_C - D_{GOP} \cdot N_{coded}}{N_{SW}} \cdot S_{GOP} \tag{3}$$

where $D_C$ is the sum of DISTS values of frames encoded. $N_{coded}$ and $N_{SW}$ are the number of frames encoded and the size of sliding window respectively. $S_{GOP}$ is the amount of frames in a GOP. $D_{GOP}$ is the target average DISTS value of each GOP which can be calculated as, $$D_{GOP} = \frac{D_{seq}}{N_{GOP}} \tag{4}$$

where $N_{GOP}$ is the amount of GOPs in a sequence.

2) Frame-Level Quality Allocation

Given GOP-level target DISTS value $$D'_{GOP},$$

it is necessary to assign target DISTS value $D_i$ to the i-th frame. This quality allocation problem can be formulated as an optimization problem which can be written as:

$$\min_{D_1, D_2, \ldots, D_{N-1}} \sum_{i=0}^{N-1} R_i(D_i), \text{ s.t. } \sum_{i=0}^{N-1} D_i \le D'_{GOP} \tag{5}$$

where $D_i$ and $R_i$ denote DISTS value and consumed bit-rate of the i-th frame respectively. This constrained optimization problem can be converted to an unconstrained one with Lagrangian multipliers in [4]. According to [4], it is necessary to minimize the GOP-level Rate-Distortion (R-D) cost J, which can be defined as:

$$J = \sum_{i=0}^{N-1} D_i + \lambda_{GOP} \sum_{i=0}^{N-1} R_i(D_i) \tag{6}$$

where $\lambda_{GOP}$ is the GOP-level Lagrangian multiplier utilized for this optimization problem and N is the amount of frames in a GOP. $D_i$ is derived for the i-th frame while minimizing J. The solution in [8] is provided as follows:

$$\lambda_{GOP} = -\frac{\kappa_i \cdot \frac{\partial D_i(Q_i)}{\partial Q_i}}{\frac{\partial R_i(Q_i)}{\partial Q_i}} \tag{7}$$

where $Q_i$ is the quantization step size of the i-th frame, and $\kappa_i$ is the influence factor of the i-th frame, which reveals the importance of a frame. Generally speaking, frames with higher $\kappa_i$ will be utilized as the reference frames for low $\kappa_i$ frames. It is a predefined constant which is related with the temporal layer of the i-th frame. By combining Equation (7), Equation (1), and Equation (2), the $\lambda_{GOP}$-$Q_i$ relationship is derived as:

$$\lambda_{GOP} = -\frac{\kappa_i \cdot \alpha_i \beta_i \cdot Q_i^{\beta_i - 1}}{\gamma_i \cdot Q_i^{-2}} \tag{8}$$

where $\alpha_i$, $\beta_i$ and $\gamma_i$; are model parameters of the i-th frame.

By combining Equation (8) and Equation (1), the obtained $\lambda_{GOP}$-$D_i$ model can be written as:

$$\lambda_{GOP} = \frac{\kappa_i \cdot \alpha_i \beta_i}{\gamma_i} \cdot \left(\frac{D_i}{\alpha_i}\right)^{1+\frac{1}{\beta_i}} \tag{9}$$

$$D_i = \alpha_i \left(\frac{\lambda_{GOP} \gamma_i}{\kappa_i \cdot \alpha_i \beta_i}\right)^{\frac{\beta_i}{\beta_i + 1}} \tag{10}$$

Considering the sum of $D_i$ equaling to $$D'_{GOP},$$

which can be written as:

$$D'_{GOP} = \sum_{i=0}^{N-1} D_i \tag{11}$$

Combining Equation (10) and Equation (11), $\lambda_{GOP}$ can be derived by solving the following equation:

$$D'_{GOP} = \sum_{i=0}^{N-1} \alpha_i \left(\frac{\lambda_{GOP} \gamma_i}{\kappa_i \cdot \alpha_i \beta_i}\right)^{\frac{\beta_i}{\beta_i + 1}} \tag{12}$$

Considering that the right hand side of Equation (12) is a monotone increasing function with respect to $\lambda_{GOP}$, the method adopted in [4] is used to solve Equation (12). After obtaining $\lambda_{GOP}$, the corresponding $D_i$ for the i-th frame is calculated according to Equation (10).

B. Coding Parameters

Given target DISTS value $D_i$ for the i-th frame, the corresponding quantization step size can be derived as follows:

$$Q_i = \left(\frac{D_i}{\alpha_i}\right)^{\frac{1}{\beta_i}} \tag{13}$$

Finally, the associated coding parameters $QP_i$ and $\lambda_i$ of the i-th frame can be derived as:

$$QP_i = \log_2(Q_i) \times 6 + 4 \tag{14}$$

$$\lambda_i = 0.57 \times 2.0^{\frac{QP_i}{3.0}} \tag{15}$$

C. Updating Scheme

After completing encoding the i-th frame, the model parameters are updated according to actual coding results. Suppose the i-th frame is encoded with coding parameters $QP_i$ and $\lambda_i$, the output bit-rate and DISTS value are $$R_i^o \text{ and } D_i^o$$

respectively. A gradient descent update method proposed in [7] is utilized for updating $\alpha_i$, $\beta_i$ and $\lambda_i$. The update scheme is as follows:

$$D_i^p = \alpha_i Q_i^{\beta_i} \quad (16)$$

$$\hat{\alpha}_i = \alpha_i + \delta_\alpha \cdot (\ln D_i^o - \ln D_i^p) \cdot \alpha_i \quad (17)$$

$$\hat{\beta}_i = \beta_i + \delta_\beta \cdot (\ln D_i^o - \ln D_i^p) \cdot \ln Q_i \quad (18)$$

$$\hat{\gamma}_i = R_i^o \cdot Q_i \quad (19)$$

where $\hat{\alpha}_i$, $\hat{\beta}_i$ and $\hat{\gamma}_i$; are updated model parameters. $Q_i$ is the corresponding quantization step size of $QP_i$. $\delta_\alpha$ and $\delta_\beta$ are update ratio of $\alpha$ and $\beta$, which are predefined constants. $\hat{\alpha}_i$, $\hat{\beta}_i$ and $\hat{\gamma}_i$ are utilized in quality allocation and coding parameters derivation for the next frame on the same temporal layer.

D. Implementation Details

Figure 2:
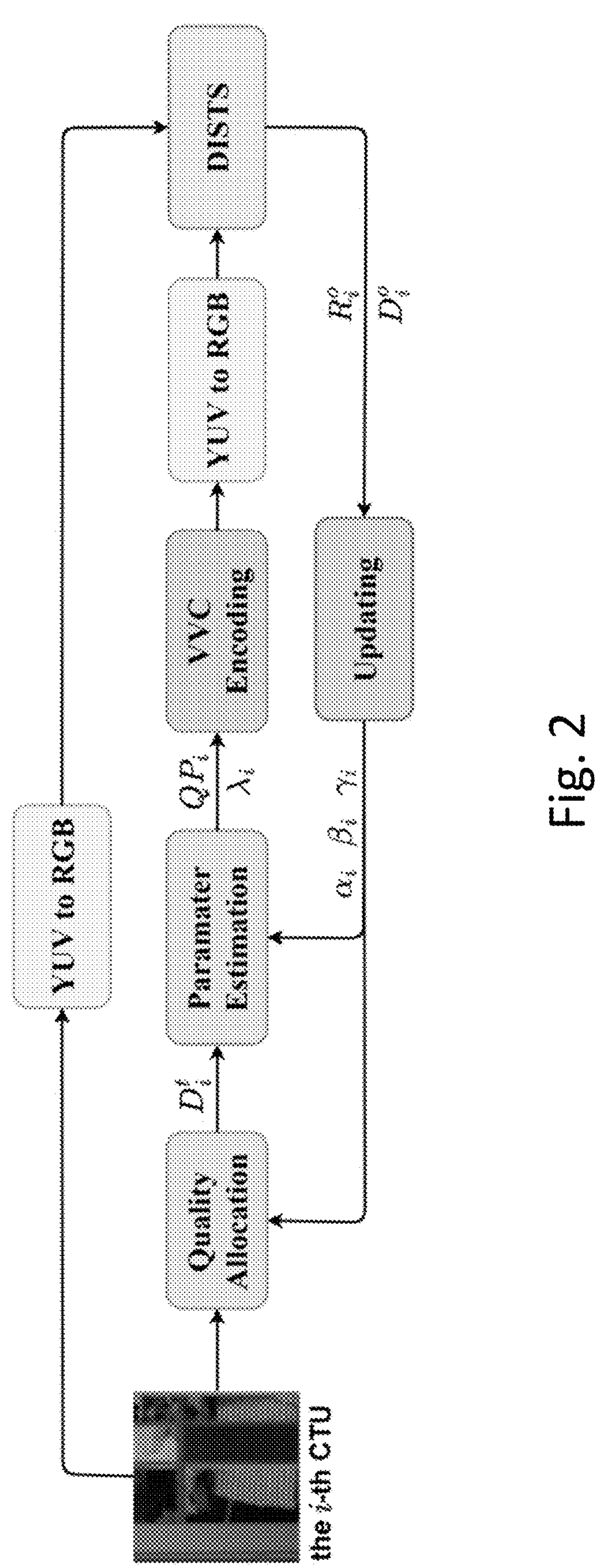
FIG. 2 illustrates operation of a video quality control algorithm in one embodiment of the invention.

In one example the proposed quality control scheme is implemented on VVenc 1.6.0. The DISTS neural network [12] is integrated with LibTorch [15] which supports both CPU and GPU platforms. The work flow is shown in FIG. 2. In particular, DISTS value estimation is performed in RGB domain while the input sequence is YUV file. The input sequence is converted to RGB domain according to Rec. BT.2020 [16] configurations.

III. Experiments

The proposed quality control algorithm is tested following the Common Test Conditions (CTCs) [17] settings under RA configuration (GOP size=32) and fast preset. The test sequences are specified in CTCs [17] as well. All experiments are conducted on an Intel Core i7-8700K and GeForce RTX 2080Ti platform without frame-level parallelism. Testing sequences are first encoded with fixed-QP configurations, setting QP to 22, 27, 32 and 37, respectively. The corresponding DISTS values are calculated and are set as the target DISTS values for quality control. To evaluate coding performance, DISTS-based BD-Rate which indicates the bit-rate savings under the same DISTS quality is utilized. Err(DISTS) is calculated to evaluate the accuracy of quality control as $$Err(DISTS) = \frac{|D^{(o)} - D^{(t)}|}{D^{(t)}} \times 100\% \quad (20)$$

where $D^{(o)}$ is the DISTS value of output sequence and $D^{(t)}$ is the corresponding target DISTS value.

A. Coding Performance

Table I shows the coding performance of proposed algorithm compared with fixed QP and Zhou et al.'s method respectively. Due to the optimal quality allocation scheme, the proposed method brings 2.78% BD-Rate savings when compared with Zhou et al.'s method in VVenc 1.6.0. Especially for Class A1 sequences, the proposed method obtains 3.89% BD-Rate savings. When compared with fixed QP configurations, there are 4.89% BD-Rate increases. It can be seen that the proposed method shows BD-Rate loss for high resolution sequences since the DISTS value calculation is based on 64×64 blocks. The prediction accuracy of the updated D-Q model will decrease for frames consisting of more CTUs. For these sequences, a CTU-level quality control scheme is required for better coding performance.

TABLE I

Illustration of the BD-rate of proposed rate control algorithm compared with Zhou et al.'s method and fixed QP configuration

| | | DISTS based BD-Rate | |
|---|---|---|---|
| Class | Sequence | vs fixed QP | vs Zhou et al.'s method |
| Class A1 | Tango2 | 18.52% | −1.92% |
| | FoodMarket4 | 10.56% | −12.77% |
| | Campfire | 7.20% | 3.04% |
| Class A2 | CatRobot | 8.97% | −3.22% |
| | DaylightRoad2 | 11.69% | −7.71% |
| | ParkRunning3 | −5.59% | 3.62% |
| Class B | MarketPlace | 16.02% | 0.15% |
| | RitualDance | −0.72% | −1.05% |
| | Cactus | 6.88% | −6.19% |
| | BasketballDrive | −1.55% | 1.41% |
| | BQTerrace | 8.14% | −5.23% |
| Class C | BasketballDrill | −3.55% | −4.36% |
| | BQMall | −1.76% | −1.04% |
| | PartyScene | −4.30% | −3.64% |
| | RaceHorses | 2.90% | −2.75% |
| Class D | BasketballPass | −3.75% | −2.26% |
| | BQSquare | 2.80% | −1.74% |
| | BlowingBubbles | 2.96% | −4.11% |
| | RaceHorses | 0.76% | −0.70% |
| | Overall | 4.89% | −2.78% |

B. Quality Control

Quality control accuracy of proposed method and Zhou et al.'s method are shown in Table II. It is found that the overall quality control accuracy decreases by 0.62%. This accuracy loss is mainly introduced by the Rate-Distortion (R-D) optimization (RDO) process in quality allocation. The main target of quality allocation is to minimize the total Rate-Distortion (R-D) cost (Equation (6)) rather than minimize the quality control error. Besides the RDO process, the rounding processes in solving Equation (12), $D_i$ derivation, and $QP_i$ $\lambda_i$ calculation may also lead to quality control error.

TABLE II

Illustration of quality control accuracy of proposed rate control algorithm compared with Zhou et al.'s method [10]

| | | Err (DISTS) | |
|---|---|---|---|
| Class | Sequence | Proposed algorithm | Zhou et al.'s method |
| Class A1 | Tango2 | 1.97% | 2.40% |
| | FoodMarket4 | 10.05% | 5.33% |
| | Campfire | 10.61% | 0.14% |

TABLE II-continued

Illustration of quality control accuracy of proposed rate control algorithm compared with Zhou et al.'s method [10]

| Class | Sequence | Err (DISTS) Proposed algorithm | Zhou et al.'s method |
|---|---|---|---|
| Class A2 | CatRobot | 2.86% | 4.21% |
| | DaylightRoad2 | 6.34% | 2.28% |
| | ParkRunning3 | 0.26% | 0.70% |
| Class B | MarketPlace | 4.03% | 5.50% |
| | RitualDance | 3.70% | 0.18% |
| | Cactus | 0.74% | 2.98% |
| | BasketballDrive | 1.48% | 3.32% |
| | BQTerrace | 1.18% | 3.72% |
| Class C | BasketballDrill | 0.24% | 3.05% |
| | BQMall | 1.12% | 1.75% |
| | PartyScene | 1.02% | 0.85% |
| | RaceHorses | 0.21% | 0.16% |
| Class D | BasketballPass | 0.30% | 0.28% |
| | BQSquare | 2.91% | 1.63% |
| | BlowingBubbles | 2.98% | 1.86% |
| | RaceHorses | 0.56% | 0.48% |
| | Overall | 2.77% | 2.15% |

C. Subjective Quality

Figure 3C:
FIGS. 3A to 3C show comparison of subjective quality of fixed QP (FIG. 3A), the proposed method in one embodiment (FIG. 3B) and Zhou et al.'s method (FIG. 3C) on an image of 400×400 blocks selected from POC 230 of video sequence "RitualDance"
Figure 3B:
Figure 3A:
Figure 4C:
FIGS. 4A to 4C show comparison of subjective quality of fixed QP (FIG. 4A), the proposed method in one embodiment (FIG. 4B) and Zhou et al.'s method (FIG. 4C) on an image of 200×200 blocks selected from POC 257 of video sequence "BasketballDrill"
Figure 4B:
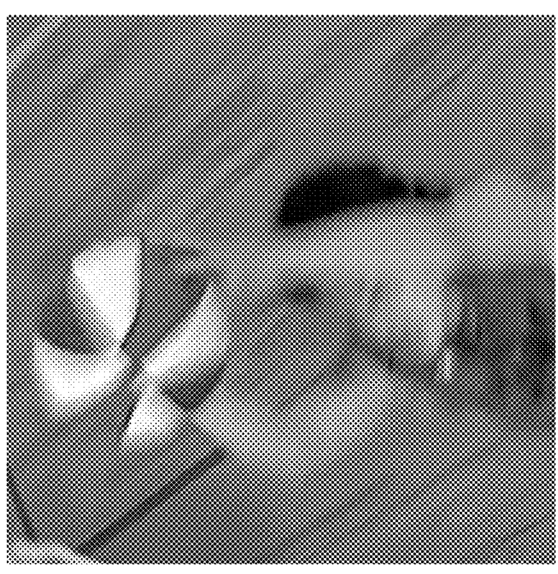
Figure 4A:

FIGS. 3A to 4C show the subjective quality of fixed QP (FIGS. 3A and 4A), the proposed quality control algorithm (FIGS. 3B and 4B) and Zhou et al.'s method (FIGS. 3C and 4C). The pictures are reconstructed frames of these three methods. The three pictures in the first (upper) row (i.e., FIGS. 3A to 3C) are 400×400 blocks selected from POC 230 of "RitualDance" with target DISTS value equals to 0.218. The three pictures in the second (lower) row (i.e., FIGS. 4A to 4C) are 200×200 blocks selected from POC 257 of "BasketballDrill" with target DISTS value equaling to 0.177. It can be seen that in this example the proposed method shows the best subjective quality of the texture of the dress and the basketball ball.

As described above, in this example, a DISTS [12] based quality control method is built for VVenc. By modelling the D-Q and R-Q relationships, the optimal target DISTS value is allocated to each frame. Afterwards, coding parameters are derived according to the target DISTS value and corresponding D-Q model. The proposed quality control algorithm is implemented in VVenc 1.6.0. Experiments show that the proposed quality control algorithm can achieve 2.78% DISTS based BD-Rate savings when compared with Zhou et al.'s method [10] with tolerable quality error. Subjective experiments also verify the effectiveness of the proposed method in this example.

IV. System

Figure 5:
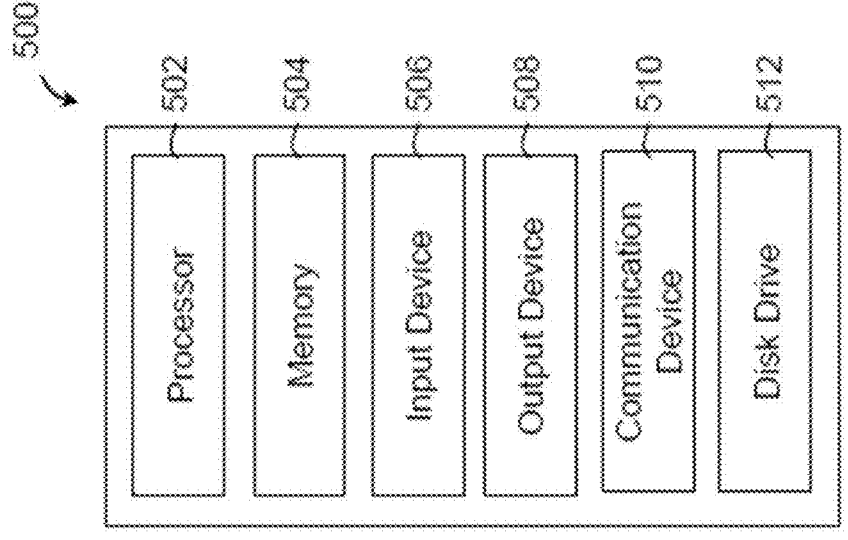
FIG. 5 is a schematic diagram of an example data processing system for performing or facilitating performing of one or more methods in one or more embodiments of the invention.

FIG. 5 shows an example data processing system 500 that can be used as a server or another type of information or data processing system in one embodiment of the invention. The data processing system 500 may be used to perform one or more method embodiments of the present invention.

The data processing system 500 generally comprises suitable components necessary to receive, store, and execute appropriate computer instructions, commands, and/or codes. The main components of the data processing system 500 are a processor 502 and a memory (storage) 504. The processor 502 may include one or more: CPU(s), MCU(s), GPU(s), logic circuit(s), Raspberry Pi chip(s), digital signal processor(s) (DSP), application-specific integrated circuit(s) (ASIC), field-programmable gate array(s) (FPGA), or any other digital or analog circuitry/circuitries configured to interpret and/or to execute program instructions and/or to process signals and/or information and/or data. The memory 504 may include one or more volatile memory (such as RAM, DRAM, SRAM, etc.), one or more non-volatile memory (such as ROM, PROM, EPROM, EEPROM, FRAM, MRAM, FLASH, SSD, NAND, NVDIMM, etc.), or any of their combinations. Appropriate computer instructions, commands, codes, information and/or data may be stored in the memory 504. Computer instructions for executing or facilitating executing the method embodiments of the invention may be stored in the memory 504. Video files and related data may be stored in the memory 504. The R-Q model, the D-Q model, etc., may be stored in the memory. The processor 502 and memory (storage) 504 may be integrated or separated (and operably connected). Optionally, the data processing system 500 further includes one or more input devices 506. Example of such input device 506 include: keyboard, mouse, stylus, image scanner, microphone, tactile/touch input device (e.g., touch sensitive screen), image/video input device (e.g., camera), etc. The input device 506 may eb used to receive user input on the quality of the image, frame, GOP, etc. Optionally, the data processing system 500 further includes one or more output devices 508. Example of such output device 508 include: display (e.g., monitor, screen, projector, etc.), speaker, headphone, earphone, printer, additive manufacturing machine (e.g., 3D printer), etc. The display may include a LCD display, a LED/OLED display, or other suitable display, which may or may not be touch sensitive. The processed image or video (frames, GOP, etc.) may be presented on the display. The data processing system 500 may further include one or more disk drives 512 which may include one or more of: solid state drive, hard disk drive, optical drive, flash drive, magnetic tape drive, etc. A suitable operating system may be installed in the data processing system 500, e.g., on the disk drive 512 or in the memory 504. The memory 504 and the disk drive 512 may be operated by the processor 502. Optionally, the data processing system 500 also includes a communication device 510 for establishing one or more communication links (not shown) with one or more other computing devices, such as servers, personal computers, terminals, tablets, phones, watches, IoT devices, or other wireless computing devices. The communication device 510 may include one or more of: a modem, a Network Interface Card (NIC), an integrated network interface, a NFC transceiver, a ZigBee transceiver, a Wi-Fi transceiver, a Bluetooth® transceiver, a radio frequency transceiver, a cellular (2G, 3G, 4G, 5G, above 5G, or the like) transceiver, an optical port, an infrared port, a USB connection, or other wired or wireless communication interfaces. Transceiver may be implemented by one or more devices (integrated transmitter(s) and receiver(s), separate transmitter(s) and receiver(s), etc.). The communication link(s) may be wired or wireless for communicating commands, instructions, information and/or data. In one example, the processor 502, the memory 504 (optionally the input device(s) 506, the output device(s) 508, the communication device(s) 510 and the disk drive(s) 512, if present) are connected with each other, directly or indirectly, through a bus, a Peripheral Component Interconnect (PCI), such as PCI Express, a Universal Serial Bus (USB), an optical bus, or other like bus structure. In one embodiment, at least some of these components may be connected wirelessly, e.g., through a network, such as the Internet or a cloud-based computing network. A person skilled in the art would appreciate that the data processing system 500 shown in FIG. 5 is merely an example and that the data processing system 500 can in other embodiments have different configurations (e.g., include additional components, has fewer components, etc.).

V. Embodiments

Figure 6:
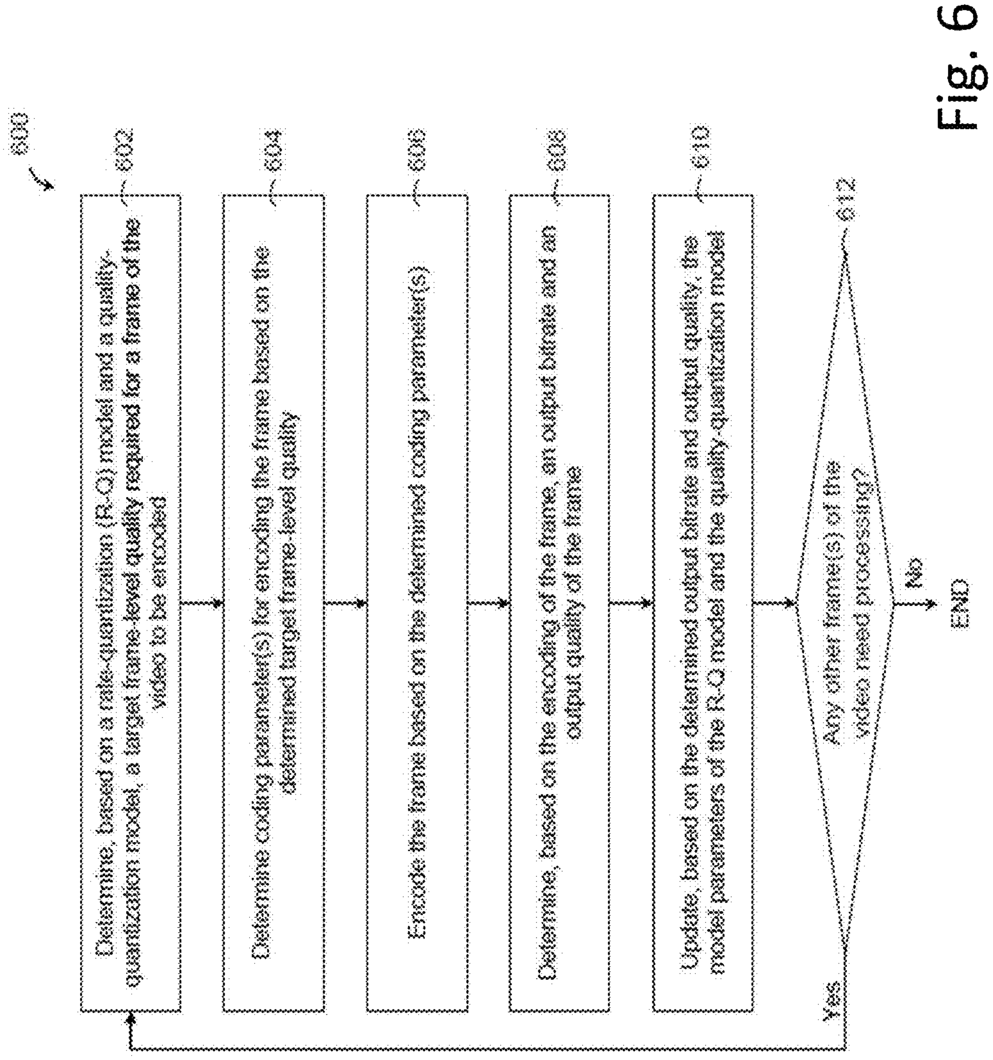
FIG. 6 is a flowchart illustrating a computer-implemented method for processing a video in some embodiments of the invention.

FIG. 6 shows a computer-implemented method 600 for processing a video in some embodiments of the invention.

The method 600 begins in step 602, in which a target frame-level quality required for a frame of the video to be encoded is determined based on a rate-quantization (R-Q) model and a quality-quantization model. The target frame-level quality may relate to a target frame-level perceptual quality (as perceivable by humans), and it may be quantified or represented as a value.

In these embodiments, the rate-quantization (R-Q) model is a model that relates bitrate and quantization step size (i.e., determines the relationship between bitrate and quantization step size). In some embodiments, the R-Q model is a linear R-Q model. In some embodiments, the R-Q model is defined by $$R = \frac{\gamma}{Q},$$

where R is bitrate, Q is quantization step size, and $\gamma$ is model parameter of the R-Q model.

In these embodiments, the quality-quantization model is a model that relates quality measure and the quantization step size (i.e., determines the relationship between the quality measure and the quantization step size). The quality measure of the quality-quantization model may be a perceptual quality measure such as a machine-learning-based perceptual quality measure. In some embodiments, the quality-quantization model is a DISTS-quantization (D-Q) model that relates deep image structure and texture similarity (DISTS) value and the quantization step size. In some embodiments, the D-Q model is defined as $D=\alpha Q^{\beta}$, where D is DISTS value, Q is quantization step size, and $\alpha$ and $\beta$ are model parameters of the D-Q model. In some embodiments, the target frame-level quality may be a target frame-level DISTS value.

In some embodiments, the determining of the target frame-level quality is further based on a determined target GOP-level quality. Accordingly, in some embodiments, the method 600 may further include determining a target GOP-level quality required for a group of pictures (GOP) of the video. The GOP includes multiple frames, including the frame to be encoded. For example, the target GOP-level quality may be a target GOP-level DISTS value. The target GOP-level quality may vary as the frame(s) of the GOP is/are encoded.

In some embodiments, the determining of the target GOP-level quality required for the GOP of the video is based on the determined sequence-level quality. Accordingly, in some embodiments, the method 600 may further include determining a sequence-level quality for a sequence of the video. Here, the sequence of the video includes multiple GOPs, and the multiple GOPs include the GOP in which the frame to be encoded is contained. The sequence-level quality may be represented as a value such as a sequence-level DISTS value. For example, the determining of the sequence-level quality (e.g., DISTS value) may be based on multiple CTU-level quality values (e.g., DISTS values). For example, the determining of the sequence-level quality (e.g., DISTS value) may be based on averaging the CTU-level DISTS values.

In some embodiments, the determining of the target frame-level quality (e.g., value) required for the frame of the video includes distributing or allocating at least part of the target GOP-level quality (e.g., value) to the plurality of frames of the GOP. In some embodiments, the determining of the target frame-level quality required for the frame of the video includes determining the target frame-level quality (e.g., value) while optimizing (e.g., minimizing) a GOP-level rate-distortion (R-D) cost function. In some embodiments, the GOP-level R-D cost function is defined based on, at least, a GOP-level Lagrangian multiplier for the GOP. In some embodiments, the GOP-level Lagrangian multiplier is related to the target GOP-level quality through the R-Q model and the D-Q model. In some embodiments, the determining of the target frame-level quality required for the frame of the video includes determining the target frame-level quality (e.g., value) required for the frame of the video based on the GOP-level Lagrangian multiplier.

After step 602, in step 604, coding parameter(s) for encoding the frame are determined based on the determined target frame-level quality in step 602. In some embodiments, the coding parameter(s) include a quantization parameter and a Lagrangian multiplier (for the frame to be encoded), and so in step 604, the determining of the coding parameter(s) for encoding the frame include determining a quantization parameter and a Lagrangian multiplier for encoding the frame. In some embodiments, the determining of the quantization parameter is based on $$Q = \left(\frac{D}{\alpha}\right)^{\frac{1}{\beta}} \text{ and } QP = \log_X(Q) \times A + B,$$

where D is the target frame-level quality represented as a target frame-level DISTS value, Q is the quantization step size, $\alpha$ and $\beta$ are are model parameters of the D-Q model, QP is the quantization parameter, A, B and X are constants. In some embodiments, the determining of the Lagrangian multiplier is based on $$\lambda = C \times D^{\frac{QP}{E}},$$

where $\lambda$ is the Lagrangian multiplier, QP is the quantization parameter, C, D, and E are constants.

In step 606, the frame is encoded by an encoder based on the determined coding parameter(s). In some embodiments, the encoding in step 606 is performed based on versatile video coding (VVC) based technique, e.g., VVenc based technique.

In step 608, an output bitrate and an output quality of the frame (that has been encoded in step 606) are determined based on the encoding of the frame. The output quality of the frame may be represented as a value, such as DISTS value.

In step 610, the model parameters of the R-Q model and the quality-quantization model (e.g., the D-Q model) are updated based on the determined output bitrate and output quality. In some embodiments, the update is performed based on a gradient descent update method.

In step 612, a determination is made as to whether there are any more frame(s) of the video to be processed. If there is no more frame of the video to be processed, then the method 600 ends. If there is still one or more frames of the video to be processed, then the method 600 returns to step 602 to process another frame of the video (using the models with updated model parameters). The another frame of the video may be a frame consecutive to the previous frame being encoded.

The method 600 may be performed for at least some (e.g., most if not all) of the frames of the video. For example, the method 600 may be performed for at least 50%, at least 60%, at least 70%, at least 80%, or at least 90% of all the frames of the video.

It should be appreciated that the order of the method steps of method 600 can be modified in some other embodiments. For example, two or more method steps can be performed in a different order or substantially simultaneously, so long as the skilled person appreciates that it is possible and feasible to do so. For example, step 612 may be performed right after step 606, and if it is determined that no frame needs processing, then the method 600 can end without further performing the step 608 and/or step 610.

Figure 7:
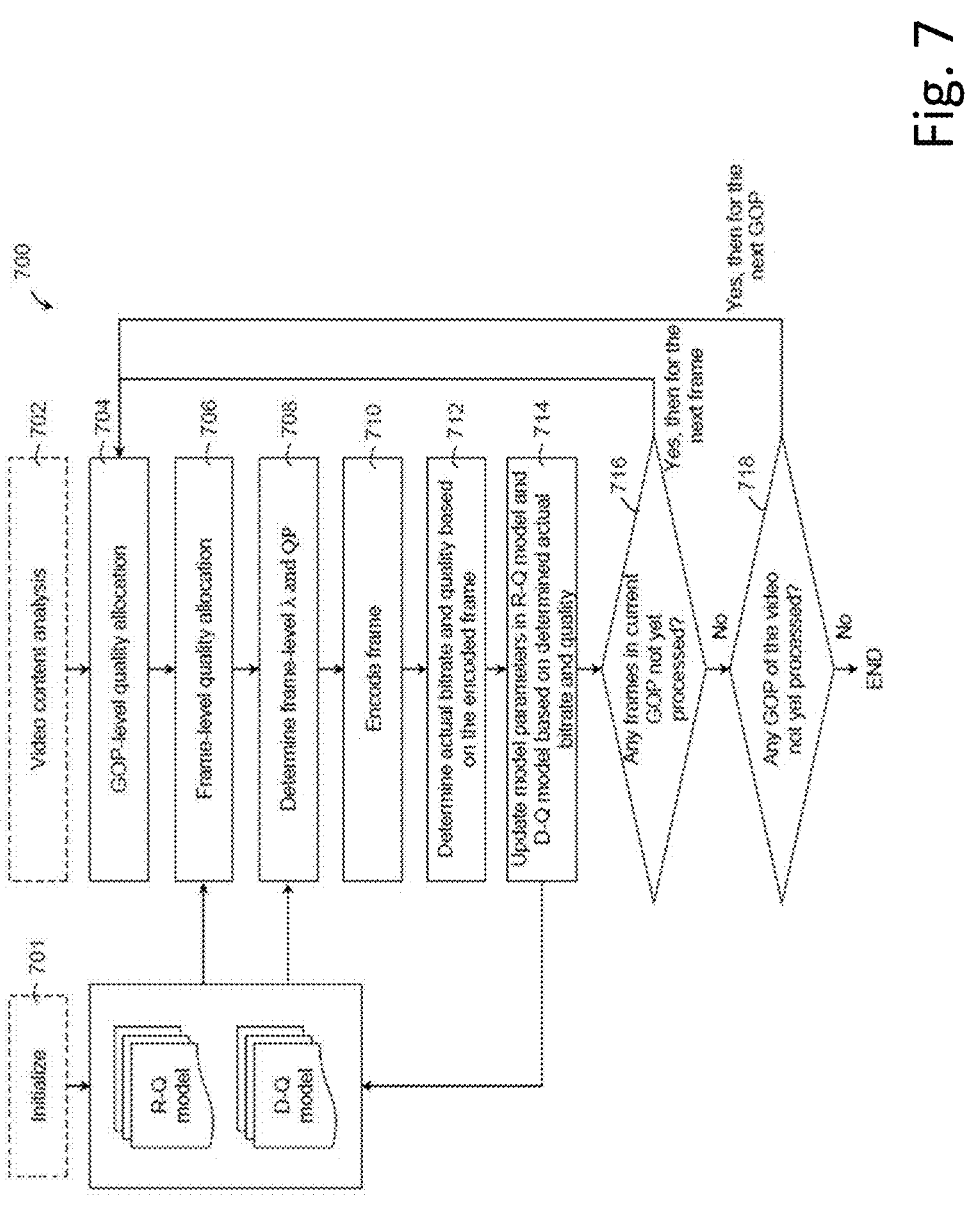
FIG. 7 is a flowchart illustrating a computer-implemented method for processing a video in some embodiments of the invention.

FIG. 7 shows a computer-implemented method 700 for processing a video in some embodiments of the invention.

The method 700 includes, in step 701, initializing an R-Q model and a D-Q model. The R-Q model and the D-Q model may be any of the ones described above with reference to FIG. 6 so for brevity details are not provided here.

The method 700 also includes, in step 702, analyzing on the content of the video to be processed. The video to be processed includes a video sequence, with multiple GOPs, and each GOP including multiple frames. In one embodiment, the analysis may include determining a sequence-level quality (e.g., value, such as sequence-level DISTS value) described above with reference to FIG. 6.

The method 700 also includes, in step 704, performing GOP-level quality allocation, to allocate quality (e.g., value) for one of the GOPs of the video. This allocation may be based on the sequence-level quality (e.g., value such as sequence-level DISTS value) obtained in step 702.

The method 700 also includes, in step 706, performing frame-level quality allocation, to allocate quality (e.g., value) to one of the frames in the GOP of the video that has been allocated a GOP-level quality (e.g., value) in step 704. This allocation may be based on the GOP-level quality (e.g., value such as GOP-level DISTS value) of the GOP, as well as the R-Q model and the D-Q model.

The method 700 also includes, in step 708, determining frame-level coding parameters including quantization parameter QP and Lagrangian multiplier $\lambda$ for the frame that has been allocated a frame-level quality (e.g., value) in step 706. This determination may be based on the D-Q model.

The method 700 also includes, in step 710, encoding the frame based on the determined frame-level coding parameters (quantization parameter QP and Lagrangian multiplier $\lambda$). The encoding may be performed based on VVC encoding techniques using a VVC-based encoder.

After encoding the frame, the method 700 then, in step 712, determines the actual bitrate used to encode the frame and the quality (e.g., value, such as DISTS value) of the encoded frame.

Subsequently, the method 700, in step 714, uses the actual bitrate used to encode the frame and the quality (e.g., value, such as DISTS value) of the encoded frame, to update one or more model parameters of the R-Q model and the D-Q model, for use in the processing of the next frame of the video.

In step 716, the method 700 determines whether any of the frame(s) in the current GOP (i.e., the GOP associated with the frame that has been processed in step 710) has yet to be processed. If it is determined that there is at least one frame that has yet to be processed, the method 700 returns to step 704 for the next frame. If it is determined that there is no further frame in the GOP that is yet to be processed, the method 700 proceed to step 718, to determine whether an of the GOP(s) of the video has yet to be processed. If it is determined that there is at least one GOP that has yet to be processed, the method 700 returns to step 704 for the next GOP (with multiple frames). If it is determined that there is no further GOP in the video that is yet to be processed, the method 700 ends.

It should be appreciated that the order of the method steps of method 700 can be modified in some other embodiments. For example, two or more method steps can be performed in a different order or substantially simultaneously, so long as the skilled person appreciates that it is possible and feasible to do so. For example, steps 716 and 718 may be performed right after step 710, and if it is determined that no frame and no GOP are yet to be processed, then the method 700 can end without further performing the other steps.

The disclosure provided with reference to FIGS. 1A to 1D, 2, 3A to 3C, and 4A to 4C (entitled "DISTS BASED PERCEPTUAL QUALITY CONTROL FOR VVC") illustrate a computer-implemented method for processing a video in some embodiments of the invention. In some embodiments, the description provided with reference to FIGS. 1A to 1D, 2, 3A to 3C, and 4A to 4C can be considered as an example implementation of the method 600 or the method 700. It should be noted, however, that the method 600, the method 700, or more generally the present invention, can have other embodiments or implementations different from those specifically illustrated and/or described.

Although not required, the embodiments described with reference to the Figures can be implemented as an application programming interface (API) or as a series of libraries for use by a developer or can be included within another software application, such as a terminal or computer operating system or a portable computing device operating system. Generally, as program modules include routines, programs, objects, components and data files assisting in the performance of particular functions, the skilled person will understand that the functionality of the software application may be distributed across a number of routines, objects and/or components to achieve the same functionality desired herein.

It will also be appreciated that where the methods and systems of the invention are either wholly implemented by computing system or partly implemented by computing systems then any appropriate computing system architecture may be utilized. This will include stand-alone computers, network computers, dedicated or non-dedicated hardware devices. Where the terms "computing system" and "computing device" are used, these terms are intended to include (but not limited to) any appropriate arrangement of computer or information processing hardware capable of implementing the function described.

Some embodiments of the invention are provided for video codec to improve coding performance, to facilitate video transmission and storage with limited resource, etc.

Some embodiments of the invention have provided a frame-level quality control scheme suitable for VVC. The quality control scheme in some embodiments of the invention adopts perceptual quality. Some embodiments of the invention provides or uses a DISTS-Q (D-Q) model to predict DISTS value for the encoding frame. Some embodiments of the invention provides an optimal quality allocation scheme for the quality control algorithm.

Some example features in some embodiments of the invention include:

- the quality control in some embodiments can minimize consumed bit-rate while ensuing perceptual quality
- in some embodiments perceptual quality is utilized to overcome the shortcomings of traditional quality metrics
- the DISTS-Q model in some embodiments can accurately predict characteristics of VVC encoder
- in some embodiments optimal quality allocation is achieved by utilizing estimated model parameters
- some embodiments provide bit-rate savings and/or subjective quality improvement when compared with other existing methods etc.

Some embodiments of the invention aim to minimize the consumed bit-rate with the constraint of perceptual quality. The proposed scheme in some embodiments delivers better R-D performance as well as visual quality improvement.

Some embodiments of the invention can achieve better coding performance as well as visual quality improvement (when compared with existing algorithms).

It is envisaged that the computation complexity of some embodiments of the invention can be reduced using neural network based calculation or technique. It is also envisaged that additional time cost associated with the neural network based calculation or technique can be reduced by implementation on a GPU and CPU mixed platform.

It will be appreciated by a person skilled in the art that variations and/or modifications may be made to the described and/or illustrated embodiments of the invention to provide other embodiments of the invention. The described/or illustrated embodiments of the invention should therefore be considered in all respects as illustrative, not restrictive. Example optional features of some embodiments of the invention are provided in the summary and the description. Some embodiments of the invention may include one or more of these optional features (some of which are not specifically illustrated in the drawings). Some embodiments of the invention may lack one or more of these optional features (some of which are not specifically illustrated in the drawings). For example, some embodiments of the invention can make use of other quality or perceptual quality measure (other than DISTS). For example, some embodiments of the invention may be applied to other encoding techniques not limited to VVenc or more generally VVC.

VI. References

[1] B. Bross, Y.-K. Wang, Y. Ye, S. Liu, J. Chen, G. J. Sullivan, and J.-R. Ohm, "Overview of the versatile video coding (VVC) standard and its applications," IEEE Transactions on Circuits and Systems for Video Technology, vol. 31, no. 10, pp. 3736-3764, 2021.

[2] G. J. Sullivan, J. Ohm, W. Han, and T. Wiegand, "Overview of the high efficiency video coding (HEVC) standard," IEEE Transactions on Circuits and Systems for Video Technology, vol. 22, no. 12, pp. 1649-1668, 2012.

[3] A. Wieckowski, J. Brandenburg, T. Hinz, C. Bartnik, V. George, Hege, C. Helmrich, A. Henkel, C. Lehmann, C. Stoffers, I. Zupancic, B. Bross, and D. Marpe, "Vvenc: An open and optimized Vvc encoder implementation," in 2021 IEEE International Conference on Multimedia Expo Workshops (ICMEW), pp. 1-2.

[4] L. Li, B. Li, H. Li, and C. W. Chen, "λ-domain optimal bit allocation algorithm for high efficiency video coding," IEEE Transactions on Circuits and Systems for Video Technology, vol. 28, no. 1, pp. 130-142, 2018.

[5] M. Zhou, X. Wei, S. Kwong, W. Jia, and B. Fang, "Rate control method based on deep reinforcement learning for dynamic video sequences in HEVC," IEEE Transactions on Multimedia, vol. 23, pp. 1106-1121, 2020.

[6] Z. He, Y. Kim, and S. K. Mitra, "Low-delay rate control for DCT video coding via ρ-domain source modeling," IEEE Transactions on Circuits and Systems for Video Technology, vol. 11, no. 8, pp. 928-940, 2001.

[7] B. Li, H. Li, L. Li, and J. Zhang, "λ-domain rate control algorithm for high efficiency video coding," IEEE Transactions on Image Processing, vol. 23, no. 9, pp. 3841-3854, 2014.

[8] Y. Mao, M. Wang, S. Wang, and S. Kwong, "High efficiency rate control for versatile video coding based on composite cauchy distribution," IEEE Transactions on Circuits and Systems for Video Technology, 2021.

[9] F. Liu and Z. Chen, "Multi-objective optimization of quality in vvc rate control for low-delay video coding," IEEE Transactions on Image Processing, vol. 30, pp. 4706-4718, 2021.

[10] M. Zhou, X. Wei, C. Ji, T. Xiang, and B. Fang, "Optimum quality control algorithm for versatile video coding," IEEE Transactions on Broadcasting, vol. 68, no. 3, pp. 582-593, 2022.

[11] Z. Wang, A. C. Bovik, H. R. Sheikh, and E. P. Simoncelli, "Image quality assessment: from error visibility to structural similarity," IEEE transactions on image processing, vol. 13, no. 4, pp. 600-612, 2004.

[12] K. Ding, K. Ma, S. Wang, and E. P. Simoncelli, "Image quality assessment: unifying structure and texture similarity," IEEE transactions on pattern analysis and machine intelligence, 2020.

[13] H. Choi, J. Yoo, J. Nam, D. Sim, and I. V. Bajic, "Pixel-wise unified rate-quantization model for multilevel rate control," IEEE Journal of Selected Topics in Signal Processing, vol. 7, no. 6, pp. 1112-1123, 2013.

[14] S. Ma, W. Gao, and Y. Lu, "Rate-distortion analysis for 264/AVC video coding and its application to rate control," IEEE Transactions on Circuits and Systems for Video Technology, vol. 15, no. 12, pp. 1533-1544, 2005.

[15] A. Paszke, S. Gross, F. Massa, A. Lerer, J. Bradbury, G. Chanan, T. Killeen, Z. Lin, N. Gimelshein, L. Antiga et al., "Pytorch: An imperative style, high-performance deep learning library," Advances in neural information processing systems, vol. 32, 2019.

[16] M. Sugawara, S.-Y. Choi, and D. Wood, "ultra-high-definition television (Rec. ITU-R BT.2020): A generational leap in the evolution of television [standards in a nutshell]," IEEE Signal Processing Magazine, vol. 31, no. 3, pp. 170-174, 2014.

[17] F. Bossen, J. Boyce, K. Suehring, X. Li, and V. Seregin, "JVET common test conditions and software reference configurations for SDR video," JVET T2010, October 2020.

The invention claimed is:

1. A computer-implemented method for processing a video, comprising:

(a) determining a target frame-level quality required for a frame of the video to be encoded, the determining of the target frame-level quality is based on, at least, a rate-quantization (R-Q) model that relates bit-rate and quantization step size and a quality-quantization model that relates quality measure and the quantization step size; and (b) determining one or more coding parameters for encoding the frame based on the determined target frame-level quality, wherein the R-Q model is defined by $$R = \frac{\gamma}{Q},$$

where R is bit-rate, Q is quantization step size, and $\gamma$ is model parameter of the R-Q model, wherein the quality-quantization model comprises a DISTS-quantization (D-Q) model that relates DISTS value and the quantization step size, and the D-Q model is defined as $D=\alpha Q^{62}$ , where D is DISTS value, Q is quantization step size, and $\alpha$ and $\beta$ are model parameters of the D-Q model, and wherein the model parameters of the R-Q model and the D-Q model are updated by actual coding results for encoding a next frame.

2. The computer-implemented method of claim 1, further comprises determining a target GOP-level quality required for a GOP of the video, the GOP comprising a plurality of frames including the frame to be encoded, and wherein the determining of the target frame-level quality is further based on the determined target GOP-level quality.

3. The computer-implemented method of claim 2, wherein the determining of the target frame-level quality required for the frame of the video comprises distributing or allocating at least part of the target GOP-level quality to the plurality of frames of the GOP.

4. The computer-implemented method of claim 2, wherein the determining of the target frame-level quality required for the frame of the video comprises determining the target frame-level quality while optimizing a GOP-level rate-distortion (R-D) cost function.

5. The computer-implemented method of claim 4, wherein the GOP-level rate-distortion cost function is defined based on, at least, a GOP-level Lagrangian multiplier for the GOP.

6. The computer-implemented method of claim 5, wherein the GOP-level Lagrangian multiplier is related to the target GOP-level quality through the R-Q model and the D-Q model;

wherein the determining of the target frame-level quality required for the frame of the video comprises determining the target frame-level quality required for the frame of the video based on the GOP-level Lagrangian multiplier; or wherein the GOP-level Lagrangian multiplier is related to the target GOP-level quality through the R-Q model and the D-Q model, and the determining of the target frame-level quality required for the frame of the video comprises determining the target frame-level quality required for the frame of the video based on the GOP-level Lagrangian multiplier.

7. The computer-implemented method of claim 1, wherein the one or more the coding parameters comprises a quantization parameter and a Lagrangian multiplier.

8. The computer-implemented method of claim 7, wherein the determining of the quantization parameter in (b) is based on $$Q = \left(\frac{D}{\alpha}\right)^{\frac{1}{\beta}} \text{ and } QP = \log_X(Q) \times A + B$$

where D is the target frame-level quality represented as a target frame-level DISTS value, Q is the quantization step size, $\alpha$ and $\beta$ are model parameters of the D-Q model, QP is the quantization parameter, A, B, and X are constants.

9. The computer-implemented method of claim 8, wherein the determining of the Lagrangian multiplier in (b) is based on $$\lambda = C \times D^{\frac{QP}{E}}$$

where $\lambda$ is the Lagrangian multiplier, QP is the quantization parameter, C, D, and E are constants.

10. The computer-implemented method of claim 1, further comprising:

(c) encoding the frame based on the one or more determined coding parameters.

11. The computer-implemented method of claim 10, wherein the encoding in (c) is performed based on versatile video coding (VVC) based technique.

12. The computer-implemented method of claim 10, further comprising:

(d) determining, based on the encoding of the frame, an output bit-rate and an output quality of the frame; and (e) updating, based on the determined output bit-rate and output quality, the model parameters of the R-Q model and the quality-quantization model.

13. The computer-implemented method of claim 12, wherein the updating in (e) is performed based on a gradient descent update method.

14. The computer-implemented method of claim 12, further comprising:

performing or repeating steps (a) to (e) for multiple frames of the video.

15. A system for processing a video, comprising:

one or more processors; and memory storing one or more programs configured to be executed by the one or more processors, the one or more programs including instructions for performing or facilitating performing of to the computer-implemented method of claim 1.

16. A non-transitory computer readable medium having instructions stored thereon which, when executed by one or more processors, cause the one or more processors to execute the computer-implemented method of claim 1.

* * * * *